US011096030B2

(12) United States Patent
Cho et al.

(10) Patent No.: US 11,096,030 B2
(45) Date of Patent: Aug. 17, 2021

(54) METHOD AND APPARATUS FOR CELL BROADCASTING SERVICE USING BROADCAST NETWORK

(71) Applicant: Electronics and Telecommunications Research Institute, Daejeon (KR)

(72) Inventors: Suk-Hee Cho, Daejeon (KR); Byung-Jun Bae, Daejeon (KR); Woong-Soo Na, Osan-si (KR); Na-Yeon Kim, Cheongju-si (KR); Dong-Joon Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/814,779

(22) Filed: Mar. 10, 2020

(65) Prior Publication Data

US 2020/0344587 A1    Oct. 29, 2020

(30) Foreign Application Priority Data

Apr. 23, 2019  (KR) .................. 10-2019-0047188
Aug. 2, 2019   (KR) .................. 10-2019-0094369

(51) Int. Cl.
*H04M 11/04*     (2006.01)
*H04W 4/90*      (2018.01)
*H04W 88/02*     (2009.01)

(52) U.S. Cl.
CPC ............. *H04W 4/90* (2018.02); *H04W 88/02* (2013.01)

(58) Field of Classification Search
CPC ... H04W 4/90; H04W 88/02; H04M 1/72519; H04M 1/72522

USPC ................. 455/404.1, 404.2, 550.1, 418
See application file for complete search history.

(56) References Cited

U.S. PATENT DOCUMENTS

| | | | |
|---|---|---|---|
| 10,652,721 B1* | 5/2020 | Daly | H04W 4/02 |
| 2008/0085695 A1 | 4/2008 | Vare et al. | |
| 2015/0189486 A1* | 7/2015 | Lee | H04L 67/26 370/259 |
| 2018/0097574 A1 | 4/2018 | Ryu | |
| 2018/0146260 A1* | 5/2018 | Li | H04N 21/440218 |
| 2018/0176637 A1 | 6/2018 | Cho et al. | |
| 2019/0090029 A1 | 3/2019 | Jung et al. | |
| 2019/0158895 A1* | 5/2019 | Kwak | H04N 21/234345 |
| 2019/0166390 A1* | 5/2019 | Kwak | H04N 21/26258 |
| 2019/0174204 A1* | 6/2019 | Deshpande | H04N 21/814 |
| 2019/0289370 A1* | 9/2019 | Deshpande | H04N 21/23614 |
| 2020/0106823 A1* | 4/2020 | Kwon | H04L 65/4076 |

FOREIGN PATENT DOCUMENTS

KR          101429965 B1     9/2014

* cited by examiner

*Primary Examiner* — Danh C Le
(74) *Attorney, Agent, or Firm* — William Park & Associates Ltd.

(57) ABSTRACT

Disclosed herein is a method of operating an apparatus for providing a cell broadcast service. The operating method includes receiving, by a transmission device of a broadcaster, a cell broadcast service signal containing an emergency alert from a mobile carrier; converting, by the transmission device, the cell broadcast service signal into a public warning broadcast signal; and transmitting, by the transmission device, the public warning broadcast signal to a mobile switching center or a base station.

9 Claims, 9 Drawing Sheets

METHOD AND APPARATUS FOR CELL BROADCASTING SERVICE USING BROADCAST NETWORK

CROSS REFERENCE TO RELATED APPLICATIONS

This application claims the benefit of Korean Patent Application No. 10-2019-0047188, filed Apr. 23, 2019, and No. 10-2019-0094369, filed Aug. 2, 2019, which are hereby incorporated by reference in their entireties into this application.

BACKGROUND OF THE INVENTION

1. Technical Field

The present invention relates to a method and apparatus for a cell broadcast service using a broadcast network.

2. Description of the Related Art

Generally, an emergency alert message is sent by national or local government authorities to the public through mobile phones. The national and local government authorities are able to broadcast an emergency alert message in the form of a text or voice message in cooperation with mobile carriers in compliance with legislation governing the management of disasters and safety in order to prevent and prepare for disasters. When a disaster is predicted or has occurred, the emergency alert message service delivers information thereabout to mobile phones, capable of receiving a Cell Broadcast Service (CBS) and located in the disaster area, in real time using a CBS function. That is, CBS is service for delivering text messages by broadcasting the same to mobile phones using a broadband network. As opposed to Short Message Service (SMS) for individually sending text to each mobile phone, CBS is a function for simultaneously messaging information to all mobile phones in a selected area, rather than to a specific mobile phone. In South Korea, text messages are provided to mobile phones using a CBS function in the event of any of various disasters, such as fine dust, a typhoon, a hurricane, flood, heavy snow, a heat wave, a fire, an earthquake, a tsunami, the eruption of a volcano, a war, and the like, or during a civil defense drill.

The messaging service based on CBS is aimed at quick information delivery in the event of a disaster, but when there is a failure in a broadband network due to the disaster, it is difficult to deliver an emergency alert message using CBS. In particular, when a backbone network, which is a main network for interconnecting various types of low-speed subnetworks and connecting distributed communication devices, is damaged, it may become impossible to send an emergency alert message to base stations using CBS.

DOCUMENTS OF RELATED ART (Patent Document 1) U.S. Patent Application Publication No. 2018/0097574, published on Apr. 5, 2018 and titled "Device and method for processing emergency alert message in broadcast system"
(Patent Document 2) U.S. Patent Application Publication No. 2008/0085695, published on Apr. 10, 2008 and titled "Emergency alert and delivery framework for broadcast systems".

SUMMARY OF THE INVENTION

An object of the present invention is to provide a method and apparatus for a cell broadcast service, which additionally transmit a cell broadcast message containing an emergency alert through a broadcast network in preparation for failure of a broadband network, thereby enabling not only TVs capable of receiving ATSC 3.0 signals but also general mobile terminals, which are capable of receiving cell broadcast service (CBS) but are not capable of receiving ATSC 3.0 signals, to receive the cell broadcast message.

Another object of the present invention is to provide a method and apparatus for a cell broadcast service, which may reduce the communication cost of mobile phone users.

The technical objects of the present invention are not limited to the above technical objects, and other technical objects that are not mentioned will be readily understood by a person of ordinary skill in the art from the following description.

An operating method of an apparatus for providing a cell broadcast service according to an embodiment of the present invention may include receiving, by the transmission device of a broadcaster, a cell broadcast service signal containing an emergency alert from a mobile carrier or the originator of the cell broadcast service signal; converting, by the transmission device, the cell broadcast service signal into a public warning broadcast signal; and transmitting, by the transmission device, the public warning broadcast signal.

In an embodiment, converting the cell broadcast service signal may include converting the cell broadcast service signal into an Advanced Emergency Alert Table (AEAT) signal; and inserting rich-media information in the AEAT signal.

In an embodiment, the AEAT signal may include an Advanced Emergency Alert (AEA) message, in which the emergency alert of the cell broadcast service signal is inserted in an AEAText field.

In an embodiment, inserting the rich-media information may include, when an Advanced Emergency Alert (AEA) message for broadcasting related to the same disaster as the disaster to which the AEAT signal is related is present, inserting the rich-media information included in the AEA message for broadcasting in the AEAT signal.

In an embodiment, inserting the rich-media information may further include inserting the emergency alert of the cell broadcast service signal in an AEAText field and additionally inserting Non-Real-Time (NRT) file information and Uniform Resource Locator (URL) information corresponding to the rich-media information in the AEAText field.

In an embodiment, inserting the rich-media information in the AEAT signal may further include adding a 'relatedAEAId' element in the AEA message.

In an embodiment, converting the cell broadcast service signal may include converting the cell broadcast service signal into a Non-Real-Time (NRT) file.

In an embodiment, the operating method may further include setting the service category attribute of a Service List Table (SLT) to 'Emergency Alert Service (EAS)' in order to indicate that the NRT file is related to the emergency alert.

In an embodiment, the operating method may further include setting an indicator in Service Layer Signaling (SLS) in order to indicate that the NRT file is related to the emergency alert.

In an embodiment, the indicator may include a flag for stipulating that the NRT file be ignored by a television but be processed by the mobile switching center or the base station.

In an embodiment, the operating method may further include, when an Advanced Emergency Alert (AEA) message for broadcasting related to the same disaster as the disaster to which an Advanced Emergency Alert Table (AEAT) signal is related is present in the AEAT signal, inserting rich-media information included in the AEA message for broadcasting in the NRT file.

An operating method of an apparatus for providing a cell broadcast service according to another embodiment of the present invention may include receiving, by the reception device of a base station, a public warning broadcast signal from a broadcaster; extracting, by the reception device, an emergency alert from the public warning broadcast signal; downloading, by the reception device, rich media when the public warning broadcast signal includes rich-media information; generating, by the reception device, Uniform Resource Locator (URL) information for accessing the downloaded rich media; and generating, by the reception device, a cell broadcast message that includes the extracted emergency alert and the generated URL information.

In an embodiment, the operating method may further include, after receiving the public warning broadcast signal, checking, by the reception device, whether an Advanced Emergency Alert (AEA) message for Cell Broadcast Service (CBS) is present.

In an embodiment, extracting the emergency alert may include extracting the emergency alert from an AEAText field when the AEA message for CBS is present.

In an embodiment, extracting the emergency alert may further include checking whether an AEA message for broadcasting related to the same disaster as the disaster to which the public warning broadcast signal is related is present using a 'relatedAEAId' element.

In an embodiment, downloading the rich media may include downloading the rich media included in a LiveMedia field or a Media field when the AEA message for broadcasting related to the same disaster is present.

In an embodiment, the operating method may further include, after receiving the public warning broadcast signal, checking, by the reception device, whether a Non-Real-Time (NRT) file for Cell Broadcast Service (CBS) is present.

In an embodiment, extracting the emergency alert may include extracting the emergency alert from the NRT file for CBS when the NRT file for CBS is present.

In an embodiment, the operating method may further include checking whether an Advanced Emergency Alert (AEA) message for broadcasting related to the same disaster as the disaster to which the public warning broadcast signal is related is present using an 'ExistCbsNrt' element, and the rich media may be downloaded when the AEA message for broadcasting is present.

An apparatus for providing a cell broadcast service according to an embodiment of the present invention may include a receiver for receiving a public warning broadcast signal; an AEAT parser for extracting an emergency alert and rich-media information from the public warning broadcast signal; and a cell broadcast message conversion device for generating Uniform Resource Locator (URL) information corresponding to the rich-media information and generating a cell broadcast message including the extracted emergency alert and the generated URL information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
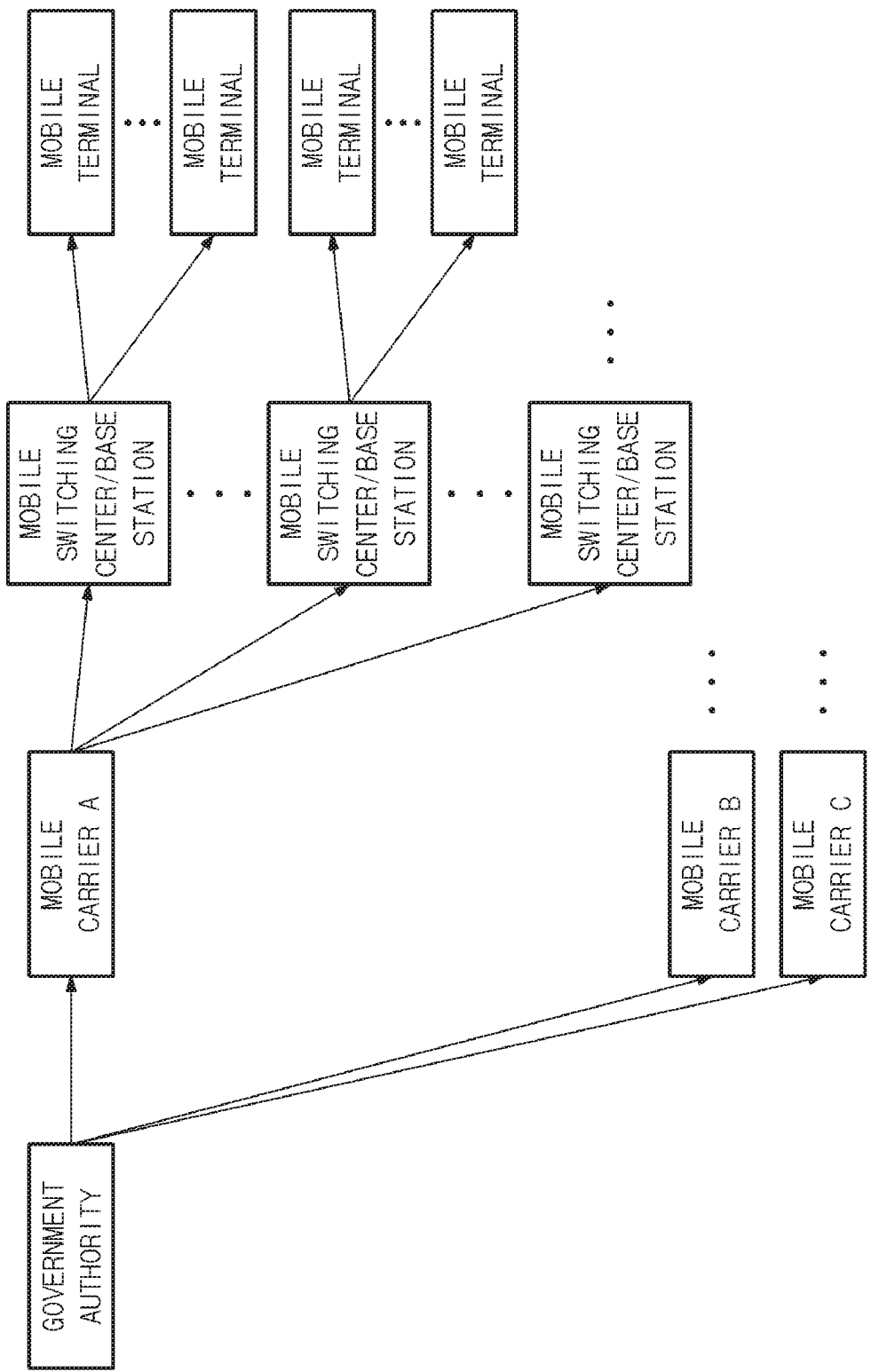
FIG. 1 is a view that illustrates a general process for providing a cell broadcast service through a broadband network.

The present invention will be described in detail below with reference to the accompanying drawings so that those having ordinary knowledge in the technical field to which the present invention pertains can easily practice the present invention.

Because the present invention may be variously changed and may have various embodiments, specific embodiments will be described in detail below with reference to the accompanying drawings. However, it should be understood that those embodiments are not intended to limit the present invention to specific disclosure forms and that they include all changes, equivalents or modifications included in the spirit and scope of the present invention. It will be understood that, although the terms "first," "second," etc. may be used herein to describe various elements, these elements are not intended to be limited by these terms. These terms are only used to distinguish one element from another element. For example, a first element could be referred to as a second element without departing from the scope of rights of the present invention. Similarly, a second element could also be referred to as a first element. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Also, the terms used herein are used merely to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

The present invention relates to a method for more reliably providing a cell broadcast service for transmitting an emergency alert, which is currently provided through a broadband network using a cell broadcast service (CBS) function. A method and apparatus for a cell broadcast service according to an embodiment of the present invention provide the function of additionally transmitting a cell broadcast message containing an emergency alert through a broadcast network in preparation for failure of a broadband network, whereby not only a TV capable of receiving ATSC 3.0 signals but also a general mobile terminal (e.g., a mobile phone that is capable of receiving CBS but is not capable of receiving ATSC 3.0 signals) may receive the cell broadcast message.

FIG. 1 is a view that illustrates a general process for providing a cell broadcast service using a broadband network. Referring to FIG. 1, in the event of a disaster, national or local government authorities may transmit an emergency alert to respective mobile carriers, and the respective mobile carriers may transmit a cell broadcast message containing the emergency alert to mobile terminals via a base station. Here, the communication standard of Cell Broadcast Service (CBS) may be the 3GPP TS23.041 standard.

Figure 2:
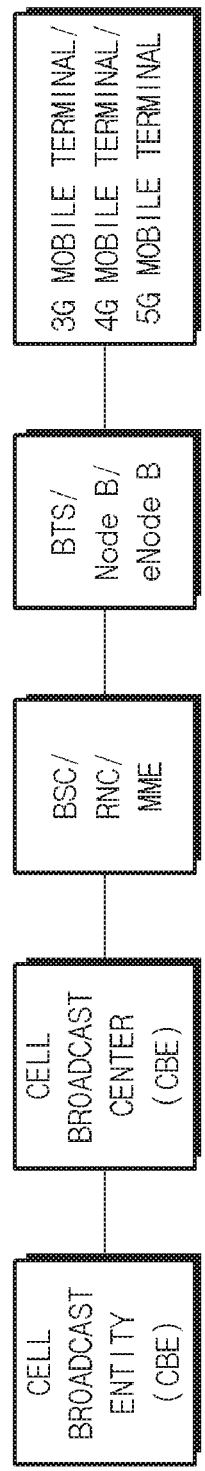
FIG. 2 is a block diagram of a cell broadcast service over 3G/4G/5G networks.

FIG. 2 is a block diagram of a cell broadcast service over a 3G, 4G or 5G network. FIG. 2 shows a basic network structure for providing a cell broadcast service specified in the 3GPP TS23.041 standard. The national or local government authorities, which are originators of a cell broadcast message containing an emergency alert, construct and manage a Cell Broadcast Entity (CBE). A Cell Broadcast Center (CBC) in each mobile carrier may receive the cell broadcast message from the CBE and transmit the same to user terminals by passing through a Base Station Controller (BSC), a Radio Network Controller (RNC), or a Mobile Management Entity (MME) in a base station and a Base Transceiver Station (BTS), a NodeB, or an eNodeB in compliance with the protocol defined in the 3GPP TS23.041 standard. Here, the BSC and the BTS are used in a 3G network, the RNC and the NodeB are used in a 4G network, and the MME and the eNodeB are used in a 5G network. However, the BSC, the RNC, and the MME serve the same function and the BTS, the NodeB, and the eNodeB serve the same function in the cell broadcast service.

When an accident or a disaster has occurred in the area in which the core network of a mobile carrier is located, the base station therein is not able to receive an emergency alert, and the users of mobile phones in the service area of the corresponding base station may not receive a cell broadcast message containing the emergency alert. Accordingly, when a cell broadcast message cannot be transmitted due to an accident or a disaster occurring in the area in which the core network of a specific mobile carrier is located, the present invention transmits the cell broadcast message through a broadcast network, whereby a mobile switching center or base station processing the cell broadcast message may receive the cell broadcast message and transmit the same to the mobile phone users.

Figure 3:
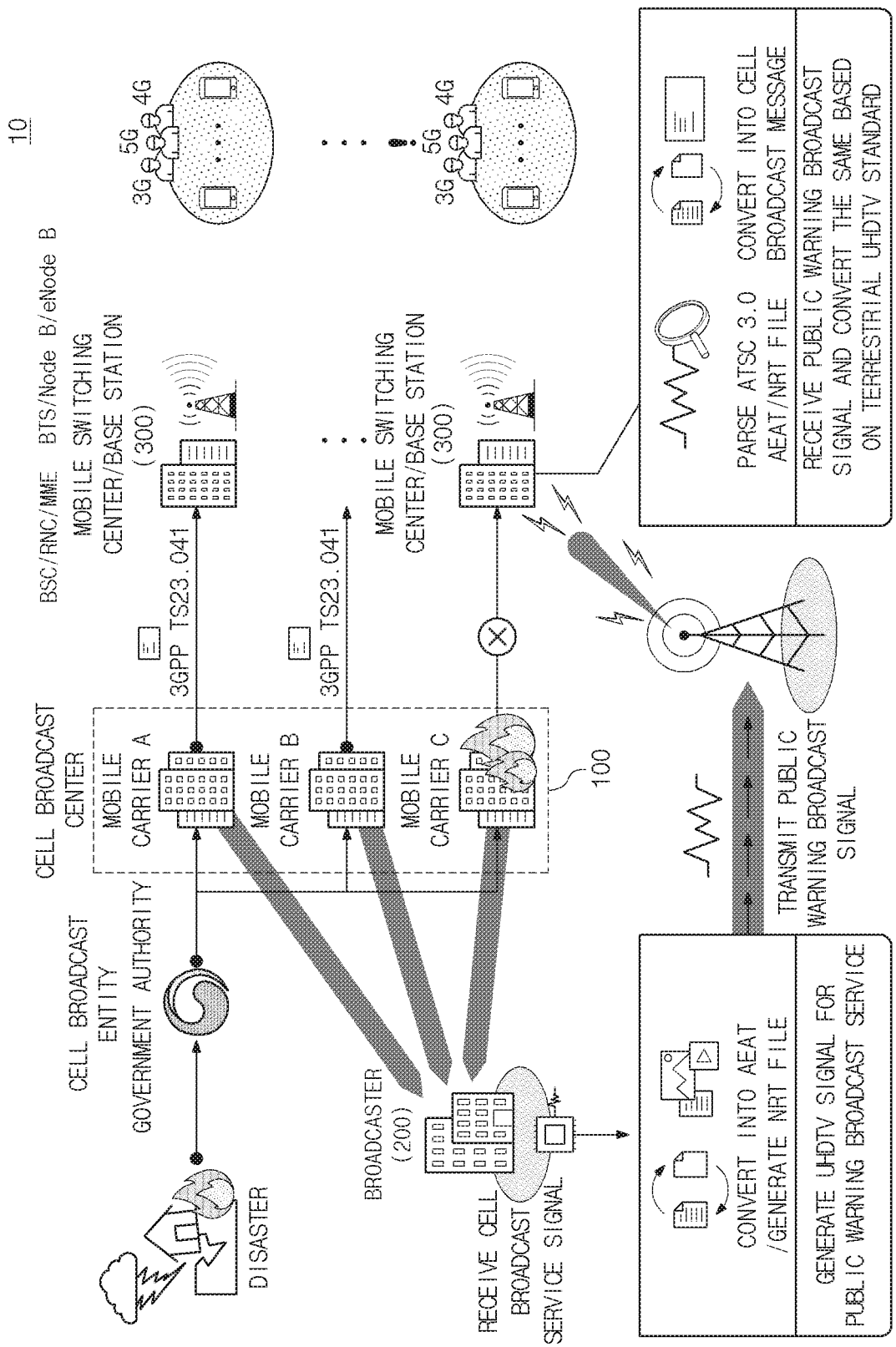
FIG. 3 is a view that illustrates a system for providing a cell broadcast service through a broadcast network according to an embodiment of the present invention.

FIG. 3 is a view that illustrates a system 10 for providing a cell broadcast service through a broadcast network according to an embodiment of the present invention. Referring to FIG. 3, the system 10 for providing a cell broadcast service may include one or more mobile carriers A, B and C 100, at least one broadcaster 200, and at least one mobile switching center/base station 300.

Terrestrial UHDTV service is based on the Advanced Television System Committee (ATSC) 3.0 standard, which is the broadcast standard of the U.S., and the ATSC 3.0 standard defines an Advanced Emergency Alert Table (AEAT) for a public warning broadcast service.

As shown in FIG. 3, a cell broadcast service using a broadcast network may be provided as follows. The national or local government authorities may construct and manage a Cell Broadcast Entity (CBE). A Cell Broadcast Center (CBC) in each of the mobile carriers 100 receives an emergency alert from the CBE and transmits the same to the mobile switching center or the base station 300 based on the protocol defined in the 3GPP TS23.041. Simultaneously, the CBC may transmit the emergency alert to the broadcaster 200 in order to transmit the same over a broadcast network.

In an embodiment, the broadcaster 200 may transmit the emergency alert, received from the mobile carrier 100, by including the same in a domestic terrestrial UHDTV signal.

In an embodiment, when a backbone network is damaged, the broadcaster 200 may generate a broadcast signal corresponding to the emergency alert, which is received from the mobile carrier 100 or the originator of the emergency alert, and transmit the same. Here, the broadcast signal may be generated based on the public warning broadcast standard of terrestrial UHDTV.

In an embodiment, a broadcast signal may be generated based on the Advanced Emergency Alert Table (AEAT) standard. The broadcast signal based on the AEAT standard may include the emergency alert included in the cell broadcast message and the Uniform Resource Locator (URL) information of rich media included in the AEAT for broadcasting.

In an embodiment, a broadcast signal may include a Non-Real-Time (NRT) file. Here, the NRT file may include an NRT file type and a flag for stipulating that the NRT file may be received by the mobile switching center or the base station 300, but may be ignored by a TV.

In an embodiment, the mobile switching center or the base station 300 may parse the emergency alert included in the broadcast signal and transmit a cell broadcast message containing the emergency alert to mobile terminals. Accordingly, even when a broadband network fails, a user may receive a cell broadcast service.

The system 10 for providing a cell broadcast service according to an embodiment of the present invention may transmit a cell broadcast message to a mobile switching center or a base station 300 through a broadband network (a first communication network) and simultaneously transmit the cell broadcast message to the mobile switching center or the base station 300 through a broadcast network (a second communication network). That is, the cell broadcast service may be redundantly provided to user terminals through the convergence of broadcast and broadband services.

Figure 4:
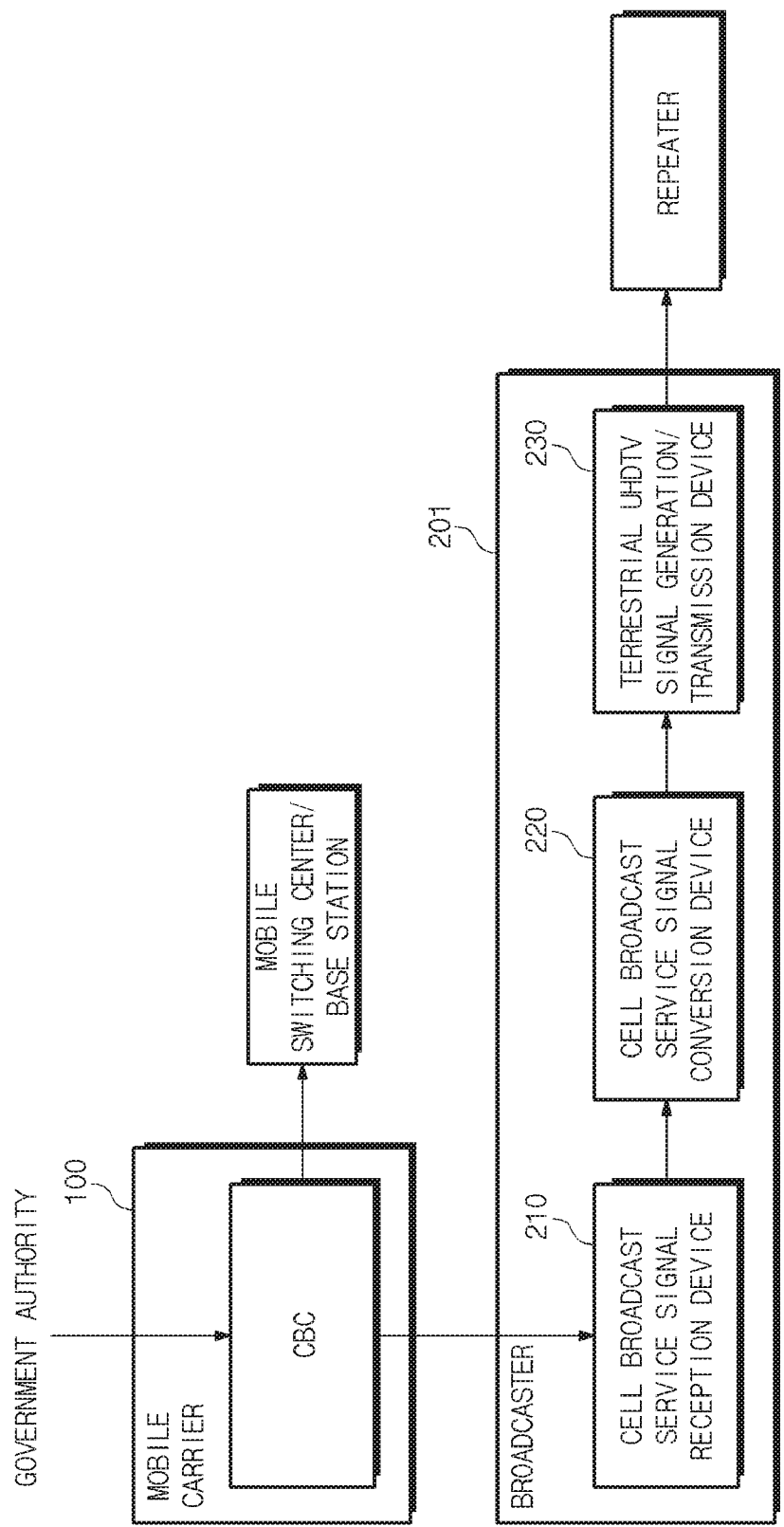
FIG. 4 is a block diagram that illustrates cell broadcast message transmission based on the convergence of broadcast and broadband services according to an embodiment of the present invention.

FIG. 4 is a view that illustrates a system for transmitting a cell broadcast message based on the convergence of broadcast and broadband services according to an embodiment of the present invention. Referring to FIG. 4, the system may include the CBC of a mobile carrier 100 and the transmission device 201 of a broadcaster.

The CBC of the mobile carrier 100 may receive a cell broadcast service (CBS) signal from the CBE of the government authorities, generate the content to transmit in compliance with the 3GPP TS23.041 standard, and transmit the generated content to the mobile switching center/base station 300 and the relevant broadcaster 200.

In an embodiment, the content transmitted from the mobile carrier 100 to the broadcaster 200 may take the same format as the signal transmitted from the mobile carrier 100 to the mobile switching center or the base station 300, or may take a new format different therefrom.

The transmission device 201 of the broadcaster 200 may include a cell broadcast service signal reception device 210, a cell broadcast service signal conversion device 220, and a terrestrial UHDTV signal generation/transmission device 230.

The cell broadcast service signal reception device 210 may be implemented so as to receive a cell broadcast service signal from the mobile carrier 100.

The cell broadcast service signal conversion device 220 may be implemented so as to convert the received signal into the format of a terrestrial UHDTV signal.

In an embodiment, the cell broadcast service signal conversion device 220 may convert the cell broadcast service signal into a signal based on the ATSC 3.0 AEAT. In an embodiment, the cell broadcast service signal conversion device 220 may convert the cell broadcast service signal into a signal based on the ATSC 3.0 AEAT and insert rich-media information into the converted signal.

In an embodiment, an AEAT signal may include one new Advanced Emergency Alert (AEA). That is, the text contained in the cell broadcast service signal may be inserted in the AEAText field of the AEA.

In an embodiment, when an AEA for broadcasting, related to the same disaster as the disaster to which the AEAT signal is related, is present, rich-media information included in the AEA for broadcasting may be inserted in the AEAT signal. For example, after the text contained in the cell broadcast service signal is inserted in the AEAText field, the NRT file information and URL information of rich media may be additionally inserted in the AEAT signal. In another example, a <relatedAEAId> element may be added to the AEA.

The terrestrial UHDTV signal generation/transmission device 230 may be implemented so as to generate a converted broadcast signal and transmit the generated broadcast signal to a repeater or a mobile switching center/base station 300.

Figure 5:
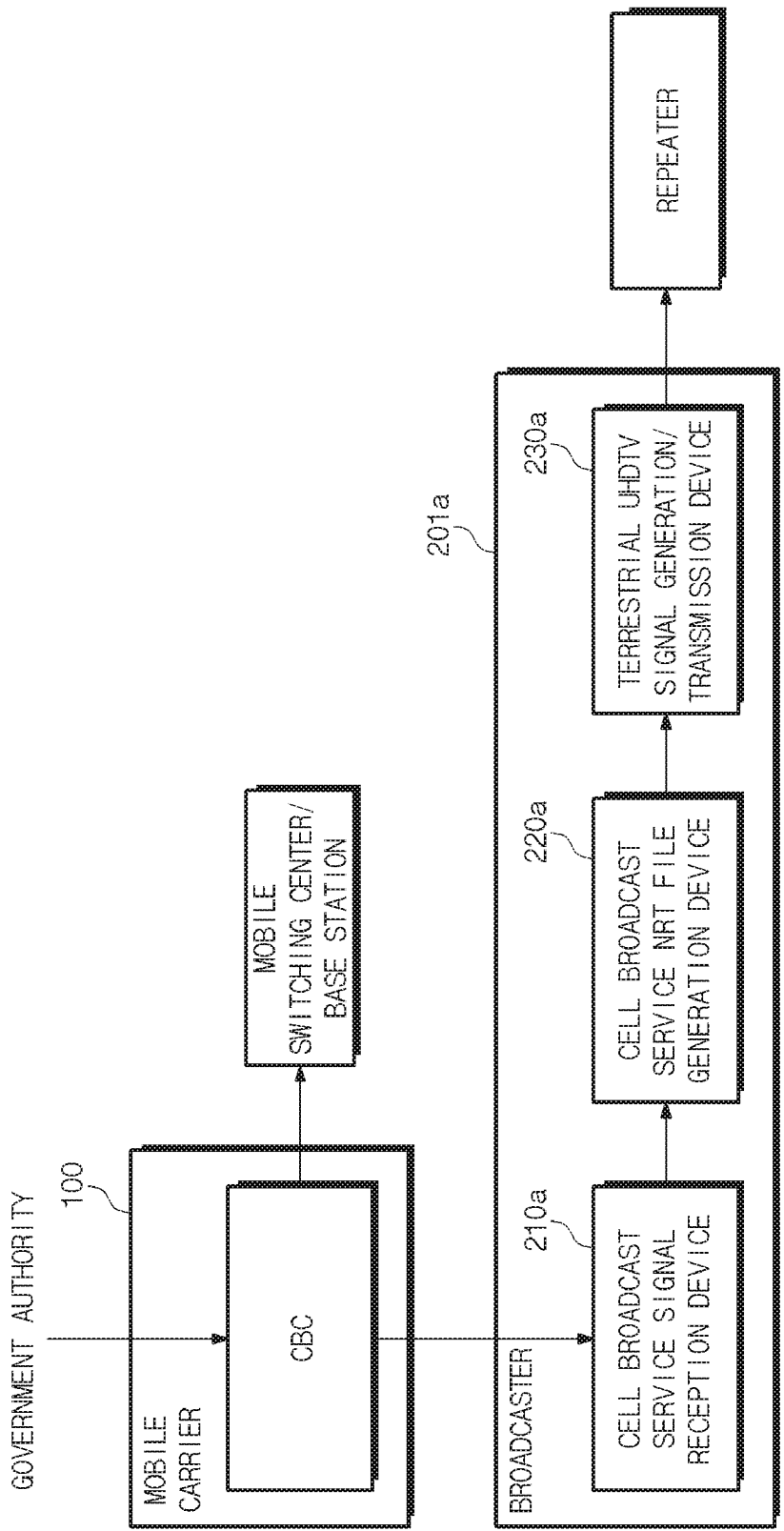
FIG. 5 is a block diagram that illustrates the transmission of a cell broadcast message through a Non-Real-Time (NRT) service component over a broadcast network according to an embodiment of the present invention.

FIG. 5 is a view that illustrates a system for transmitting a cell broadcast message using an NRT service component over a broadcast network according to an embodiment of the present invention.

Referring to FIG. 5, the transmission device of a broadcaster 200, that is, a cell-broadcast-service-signal-processing device 201A, may include a cell broadcast service signal reception device 210A, a cell broadcast service Non-Real-Time (NRT) file generation device 220A, and a terrestrial UHDTV signal generation/transmission device 230A.

The cell broadcast service signal reception device 210A may be implemented so as to receive a cell broadcast service signal from a mobile carrier 100.

The cell broadcast service NRT file generation device 220A may be implemented so as to encapsulate the received signal in an NRT file.

In an embodiment, the cell broadcast service NRT file generation device 220A may convert the cell broadcast service signal into an NRT file format. Here, it is necessary to additionally define information for announcing that the NRT file contains the content of the cell broadcast service signal. To this end, the service category attribute of a Service List Table (SLT) may be set to 'Emergency Alert Service (EAS)'. Alternatively, information indicating that the NRT file contains the content of a cell broadcast service signal may be defined in Service Layer Signaling (SLS). Here, the NRT file may include a flag for stipulating that the NRT file be processed only by a base station but be ignored by a TV.

In an embodiment, when an AEA message for broadcasting, related to the same disaster as the disaster to which AEAT is related, is present, the NRT file may further include rich-media information included in the AEA message. For example, the NRT file may add an <ExistsCbsNrt> element therein.

The terrestrial UHDTV signal generation/transmission device 230A may be implemented so as to generate an encapsulated broadcast signal and transmit the same to a repeater as an NRT service component specified in the terrestrial UHDTV standard (ATSC 3.0).

Figure 6:
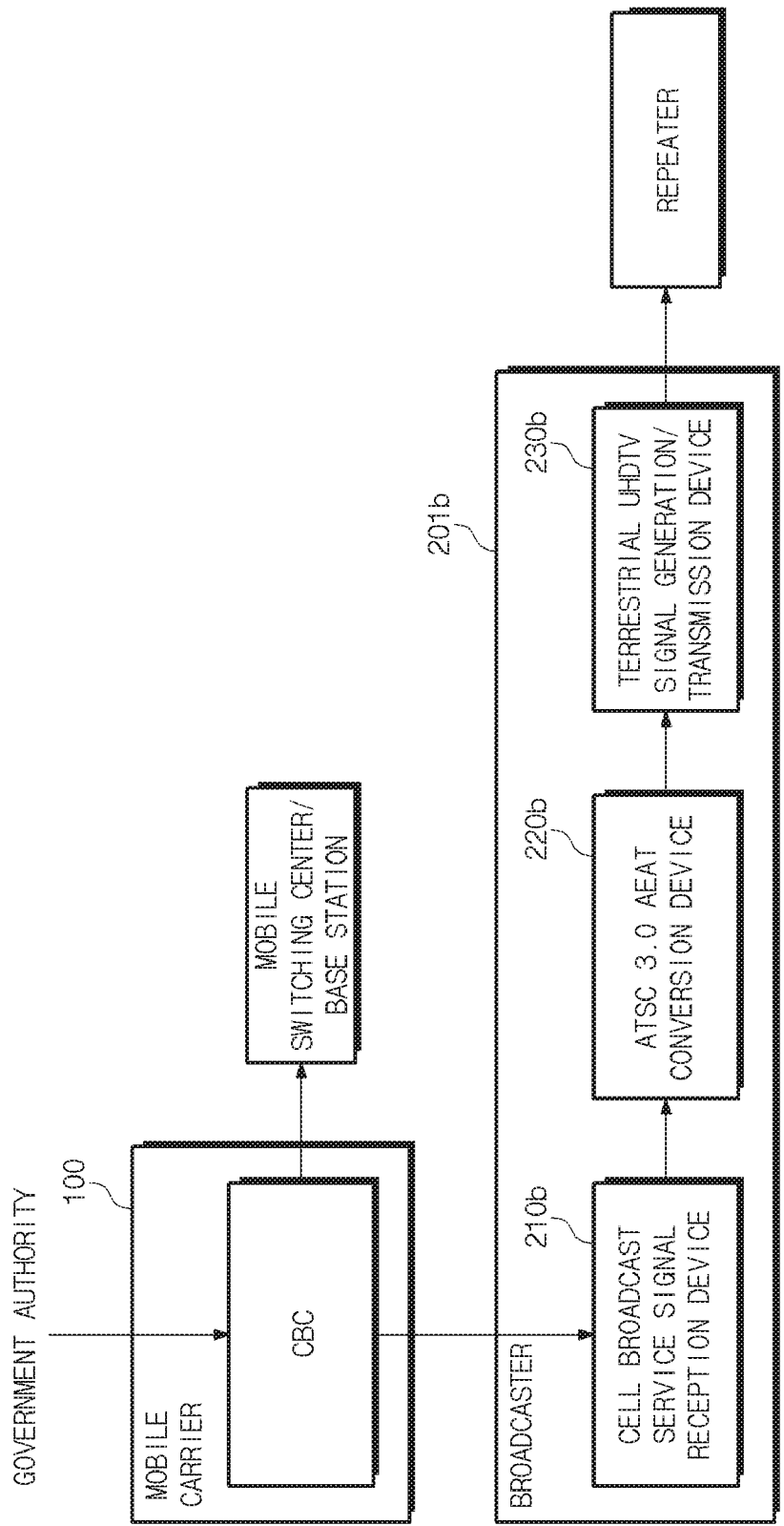
FIG. 6 is a view that illustrates an embodiment of a cell-broadcast-service-signal-processing device of a broadcaster according to an embodiment of the present invention.

FIG. 6 is a view that illustrates an embodiment of a cell-broadcast-service-signal-processing device 201B of a broadcaster 200 according to an embodiment of the present invention.

Referring to FIG. 6, the cell-broadcast-service-signal-processing device 201B may include a cell broadcast service signal reception device 210B, an ATSC 3.0 AEAT conversion device 220B, and a terrestrial UHDTV signal generation/transmission unit 230B.

The cell broadcast service signal reception device 210B may be implemented so as to receive a cell broadcast service signal from a mobile carrier 100.

The ATSC 3.0 AEAT conversion device 220B may be implemented so as to convert the received signal into an AEAT signal defined in the terrestrial UHDTV standard (ATSC 3.0).

The terrestrial UHDTV signal generation/transmission device 230B may be implemented so as to generate a converted broadcast signal and transmit the same to a repeater.

Although the cell broadcast message and the AEAT have different formats defined in different standards, both of them may include disaster information, such as the type of disaster (a typhoon, an earthquake, an accident, or the like), a disaster area, the time at which the disaster has occurred, and the like. Therefore, a cell broadcast message based on the telecommunications standard may be transmitted after being converted into an AEAT signal format based on the broadcast standard. Here, when it is difficult to convert all of the elements included in the cell broadcast message based on the telecommunications standard into elements in the AEAT in a one-to-one manner, a new element for the element of the cell broadcast message may be additionally defined in the AEAT, or a reserved element in the AEAT may be used therefor.

Figure 7:
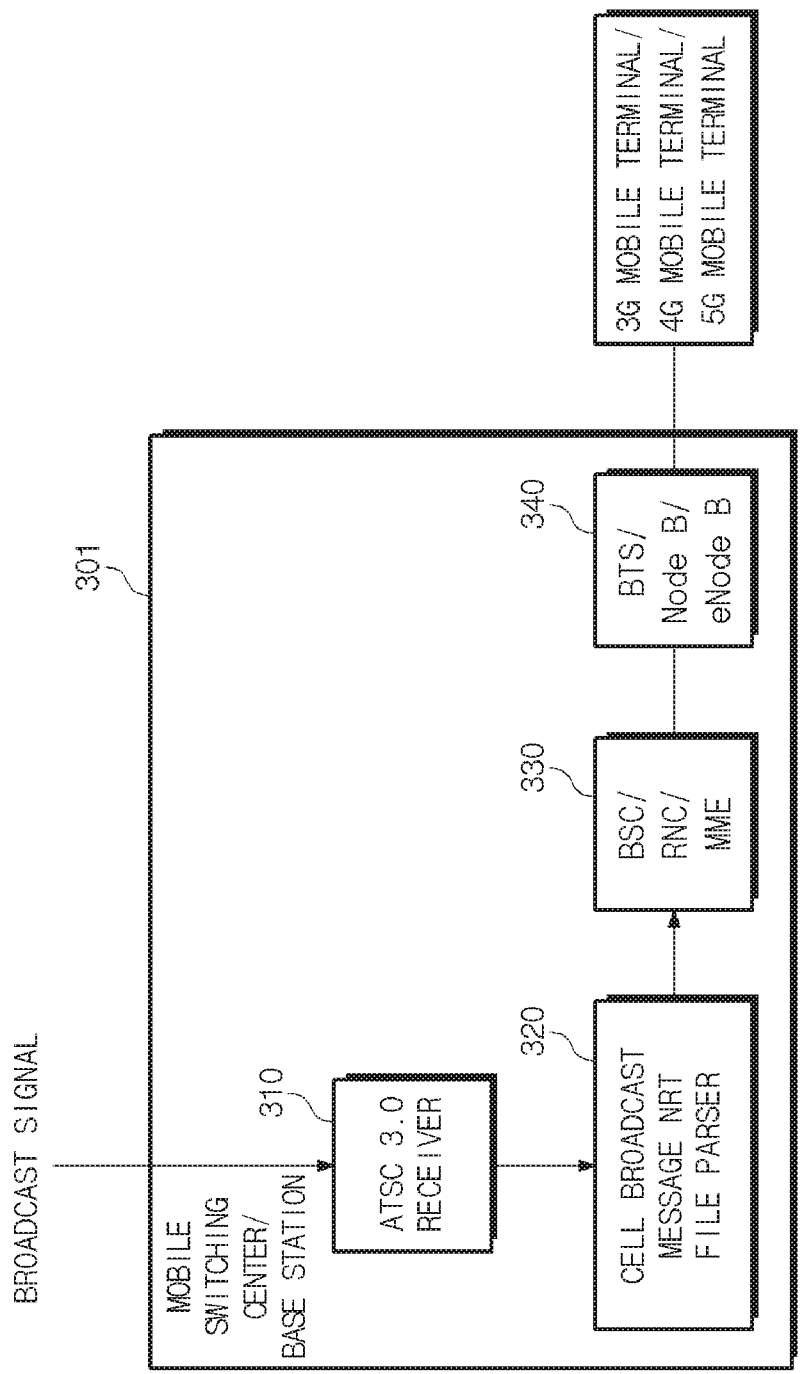
FIG. 7 is a block diagram that illustrates the reception of a cell broadcast message through an NRT service component over a broadcast network according to an embodiment of the present invention.

FIG. 7 is a view that illustrates a cell broadcast message reception device 301, which receives a cell broadcast message as an NRT service component over a broadcast network, according to an embodiment of the present invention. Referring to FIG. 7, the reception device 301 of the mobile switching center/base station 300 may include an ATSC 3.0 receiver 310, a cell broadcast message NRT file parser 320, a BSC/RNC/MME 330, and a BTS/NodeB/eNodeB 340.

The ATSC 3.0 receiver 310 may be implemented so as to receive cell broadcast message information from a broadcast network 200. The ATSC 3.0 receiver 310 may be implemented so as to check whether an NRT file including a cell broadcast message is present in the received signal.

The cell broadcast message NRT parser 320 may be implemented so as to parse the NRT file and transmit the parsed NRT file to the BSC/RNC/MME 330.

Figure 8:
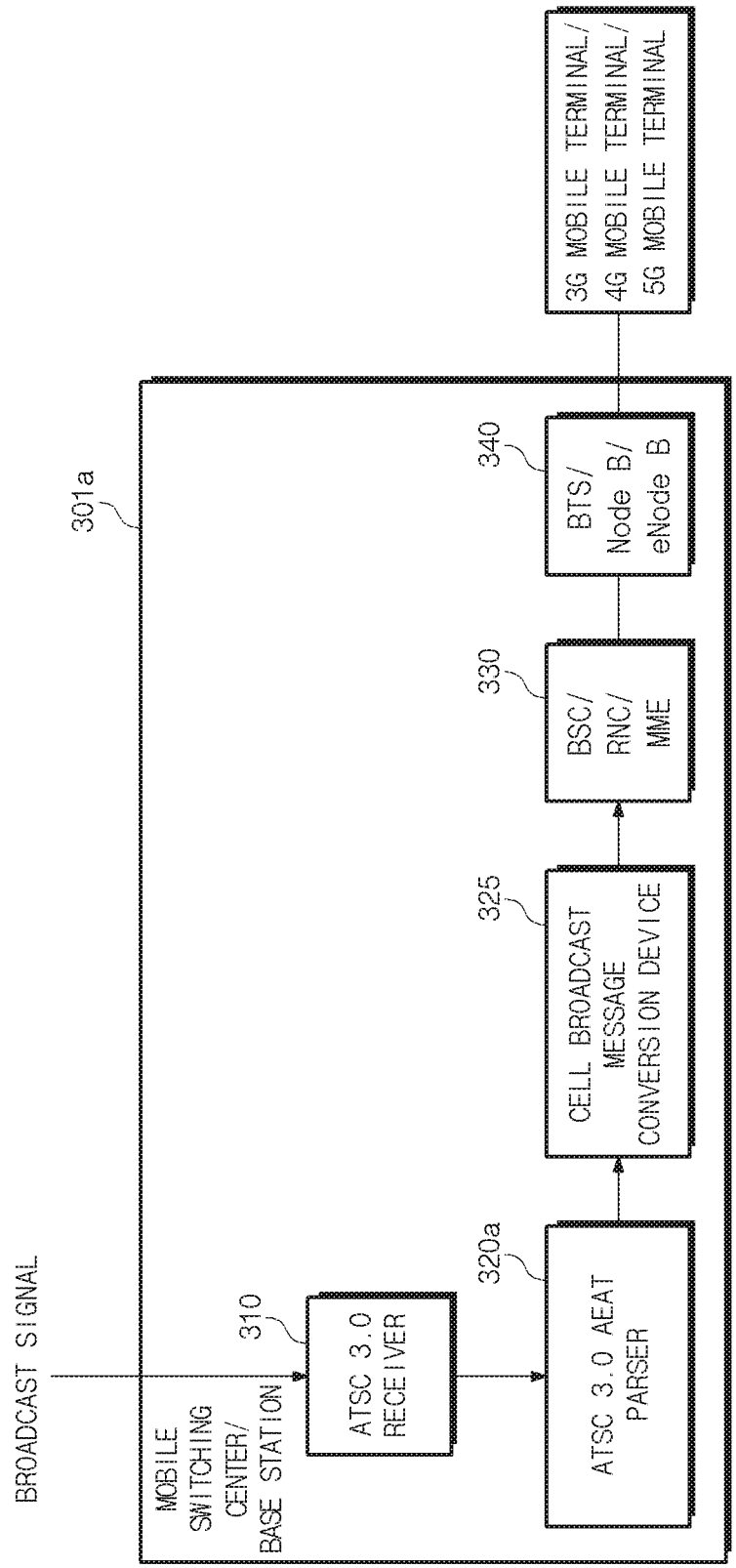
FIG. 8 is a block diagram that illustrates the reception of a cell broadcast message in the form of an ATSC 3.0 Advanced Emergency Alert Table (AEAT) over a broadcast network.

FIG. 8 is a view that illustrates the reception of a cell broadcast message in an ATSC 3.0 AEAT format from a broadcast network. Referring to FIG. 8, the reception device 301A of the mobile switching center/base station 300 may include an ATSC 3.0 receiver 310, an ATSC 3.0 AEAT parser 320A, a cell broadcast message conversion device 325, a BSC/RNC/MME 330, and a BTS/NodeB/eNodeB 340.

The ATSC 3.0 receiver 310 may be implemented so as to receive a public warning broadcast signal, including the content of a cell broadcast message, from a broadcast network.

The ATSC 3.0 AEAT parser 320A may be implemented so as to check whether an AEAT is included in the public warning broadcast signal received by the ATSC 3.0 receiver 310 and to parse the AEAT when the AEAT is present.

If the AEAT is configured such that the content of the cell broadcast message is included in the AEAText field thereof and rich-media information is additionally added in the AEAT, the ATSC 3.0 AEAT parser 320A parses the AEAT as follows. The ATSC 3.0 AEAT parser 320A may check whether an AEA message for cell broadcast service (CBS) is present in the public warning broadcast signal. If an AEA message for CBS is found in the public warning broadcast signal, the ATSC 3.0 AEAT parser 320A may extract the content of the cell broadcast message from the AEAText field. In an embodiment, the ATSC 3.0 AEAT parser 320A may check whether rich-media information is included in the LiveMedia field or the Media field. If rich-media information is present, the ATSC 3.0 AEAT parser 320A may download rich media included in the LiveMedia field or the Media field and generate a URL through which the downloaded rich media can be accessed.

If a <relatedAEAId> element is added in the AEA, the ATSC 3.0 AEAT parser 320A may parse the AEAT as follows. The ATSC 3.0 AEAT parser 320A may check whether the public warning broadcast signal includes an AEA message for CBS. If the AEA message for CBS is found in the public warning broadcast signal, the ATSC 3.0 AEAT parser 320A may extract the content of the cell broadcast message from the AEAText field. In an embodiment, the ATSC 3.0 AEAT parser 320A may check whether an AEA message for broadcasting related to the same disaster as the disaster to which the AEAT signal is related is present using the <relatedAEAId> element. If the AEA message for broadcasting related to the same disaster is present, the ATSC 3.0 AEAT parser 320A may download rich media included in the LiveMedia field or the Media field and generate a URL through which the downloaded rich media can be accessed.

The cell broadcast message conversion device 325 may be implemented so as to convert the parsed AEAT signal (the text of the cell broadcast message or the URL information) into a cell broadcast message format and to transmit the cell broadcast message to the BSC/RNC/MME 330. In an embodiment, the cell broadcast message conversion device 325 may generate a cell broadcast message including the text or the URL information.

Also, a preferred signal-processing method in which, when a mobile switching center or a base station redundantly receives a cell broadcast message from both a broadcast network and a broadband network, it processes the signal received from the broadband network first and ignores the signal from the broadcast network, may be required.

The present invention embodies a method for providing a cell broadcast service using a broadcast network, but multimedia service, including text, video, audio, and the like provided through a broadband network, may also be provided through a broadcast network, as shown in the concept diagram in FIG. 3. That is, media, provided through a broadband network, may be transmitted to the mobile switching center/base station as a broadcast signal through a broadcast network, and may then be transmitted from the mobile switching center/base station to the mobile terminal of a user through a broadband network. When the cell broadcast service according to the present invention is realized, it is expected that the communication cost borne by mobile phone users will be reduced.

The present invention relates to a method for more reliably providing a cell broadcast service for transmitting an emergency alert, which is currently provided through a broadband network using a Cell Broadcast Service (CBS) function. To this end, the present invention provides the function of additionally transmitting a cell broadcast message through a broadcast network in preparation for failure of the broadband network, thereby improving service related to public safety.

Figure 9:
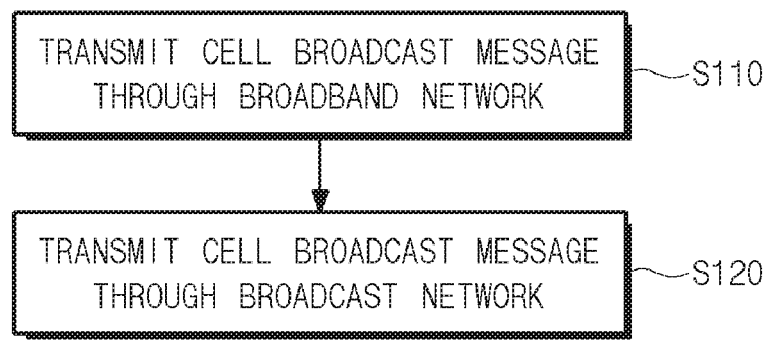
FIG. 9 is a view that illustrates a method of operating a cell broadcast service system according to an embodiment of the present invention.

FIG. 9 is a view that illustrates a method of operating a cell broadcast service system according to an embodiment of the present invention. Referring to FIGS. 1 to 9, the method of operating the CBS system may be performed as follows.

The CBS system may transmit a cell broadcast message through a broadband network at step S110. Also, the CBS system may transmit the cell broadcast message through a broadcast network.

In an embodiment, a Cell Broadcast Entity (CBE) may transmit an emergency alert to a Cell Broadcast Center (CBC) in the event of a disaster.

In an embodiment, the CBC may transmit the emergency alert to a mobile switching center/base station through a broadband network. In an embodiment, the CBC may transmit a signal corresponding to the emergency alert to the transmission device of at least one broadcaster.

In an embodiment, the signal transmitted to the broadcaster may be converted into an Advanced Emergency Alert Table (AEAT) signal, and a terrestrial TV signal for a public warning broadcast service may be generated from the AEAT signal and may then be transmitted to the mobile switching center/base station.

In an embodiment, a Non-Real-Time (NRT) file is generated from the signal transmitted to the broadcaster, and a terrestrial TV signal for a public warning broadcast service may be generated from the NRT file and may then be transmitted to the mobile switching center/base station.

In an embodiment, the mobile switching center/base station may convert the received emergency alert into a cell broadcast message and transmit the cell broadcast message to at least one user terminal.

In an embodiment, the mobile switching center/base station may receive the emergency alert in the format based on the ATSC 3.0 broadcast signal standard from a broadcaster or a repeater, parse an NRT file for CBS, and transmit the parsed NRT information to a BSC/RNC/MME.

In an embodiment, the mobile switching center/base station may receive the emergency alert from the broadcaster/repeater, parse the ATSC 3.0 AEAT, convert the AEAT into a cell broadcast message, and transmit the cell broadcast message to the BSC/RNC/MME.

In an embodiment, the CBC of the mobile carrier may transmit the emergency alert to the transmission device of a broadcaster based on the 3GPP TS23.041 standard.

The CBS system according to an embodiment of the present invention may implement CBS so as to be redundantly provided using a broadcast network.

Meanwhile, FIGS. 3, 7 and 8 illustrate the mobile communication environment of user terminals as 3G, 4G, and 5G. However, it should be understood that the mobile communication environment is not limited to these examples, and that the cell broadcast service of the present invention may also be provided in the next-generation mobile communication environment.

After it receives a cell broadcast service signal, the broadcaster according to an embodiment of the present invention may determine whether to transmit a broadcast signal including the emergency alert contained in the cell broadcast service signal.

In an embodiment, when the emergency alert involves a war, a terrorist attack, or the like, the broadcaster may generate a public warning broadcast signal in response to the received cell broadcast service signal and transmit the same. In an embodiment, when the emergency alert involves threats to safety attributable to a natural disaster or the like, the broadcaster may generate a public warning broadcast signal in response to the cell broadcast service signal received from a mobile carrier and transmit the same only when it receives a request from the mobile carrier (e.g., in the event of failure of a broadband network).

Also, a base station according to an embodiment of the present invention may receive a public warning broadcast signal from the broadcaster and extract and transmit the emergency alert.

In an embodiment, when it receives both an AEAT signal and a cell broadcast service signal, the base station may determine the urgency level of an emergency alert extracted therefrom. If the emergency alert involves a war, a terrorist attack, or the like, the base station may additionally provide rich-media information pertaining thereto by analyzing the content of the AEAT signal or using an <ExistCbsNrt> element, but if not, the base station may ignore the AEAT signal and transmit only a cell broadcast message.

In another embodiment, when the base station receives only an AEAT signal, the base station may extract the emergency alert from the AEAText field of the AEAT signal, check whether rich-media information is present, download rich media when rich-media information is present, generate a URL for accessing the rich media, generate a cell broadcast message including the emergency alert and the URL information, and transmit the cell broadcast message.

In another embodiment, when the base station receives only an AEAT signal, the base station may extract the emergency alert from the AEAText field of the AEAT signal, check whether an AEA message for broadcasting related to the same disaster as the disaster to which the AEAT signal is related is present using a <relatedAEAId> element, download rich media when an AEA message related to the same disaster is present, generate a URL for accessing the rich media, generate a cell broadcast message including the emergency alert and the URL information, and transmit the cell broadcast message.

In another embodiment, when the base station receives only an AEAT signal, the base station may check whether an NRT file for cell broadcast service (CBS) is present in the received signal, extract an emergency alert from the NRT file when an NRT file is present, check whether an AEA message for broadcasting related to the same disaster as the disaster to which the NRT file is related is present using an <ExistCbsNrt> element, download rich media when an AEA message related to the same disaster is present, generate a URL for accessing the rich media, generate a cell broadcast message including the emergency alert and the URL information, and transmit the cell broadcast message.

Figure 10:
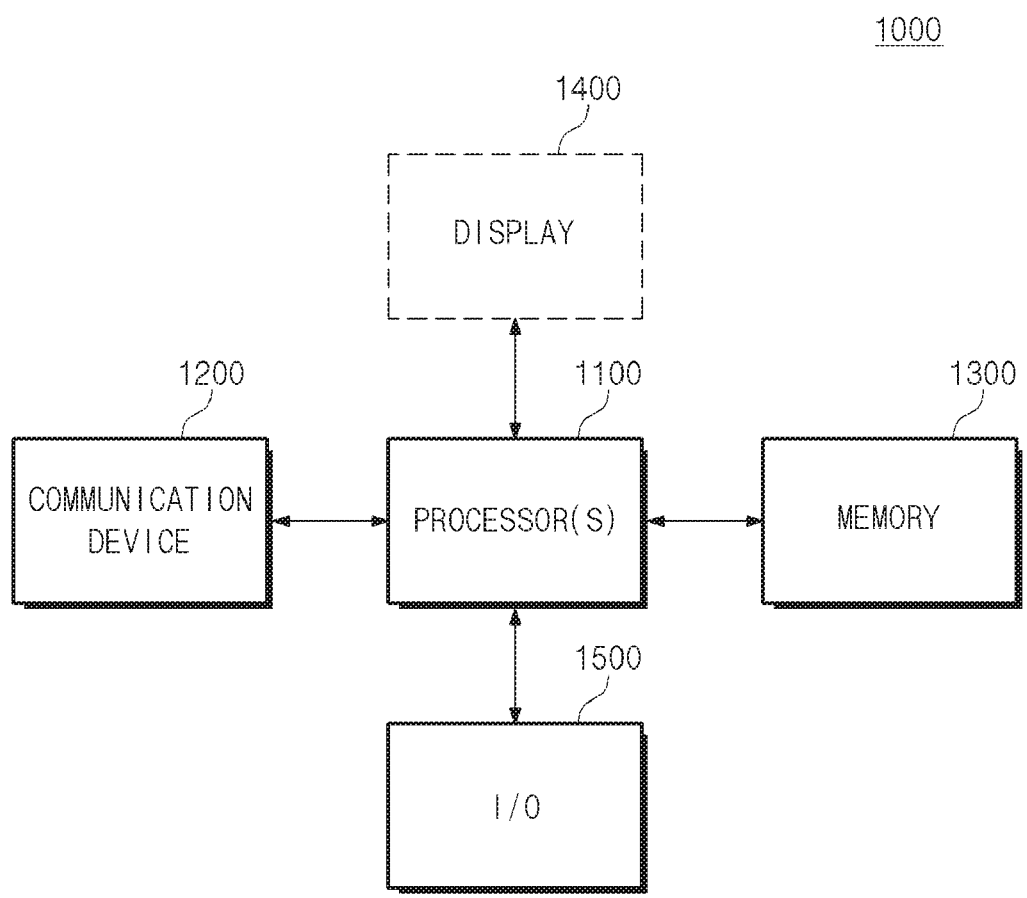
FIG. 10 is a view that illustrates an apparatus for transmitting and receiving a cell broadcast message according to an embodiment of the present invention.

FIG. 10 is a view that illustrates an apparatus 1000 for transmitting and receiving a cell broadcast message according to an embodiment of the present invention. Referring to FIG. 10, the apparatus 1000 for transmitting and receiving a cell broadcast message may include at least one processor 1100, a network interface 1200, memory 1300, a display 1400, and an input/output device 1500.

The processor 1100 may include at least one of the devices described with reference to FIGS. 1 to 9, or may be implemented using at least one of the methods described with reference to FIGS. 1 to 9. The processor 1100 may execute instructions for transmitting an emergency alert from the Cell Broadcast Center (CBC) of a mobile carrier to a mobile switching center or a base station through a broadband network and transmitting the emergency alert from the transmission device of a broadcaster to the mobile switching center or the base station through a broadcast network, as described above.

The processor 1100 may run programs and control the apparatus 1000 for transmitting and receiving a cell broadcast message. The apparatus 1000 may be connected with an external device (e.g., a personal computer or a network) and may exchange data therewith via the I/O devices 1500. The apparatus 1000 may be any of various types of electronic systems, including mobile devices such as a mobile phone, a smartphone, a PDA, a tablet PC, a laptop, and the like, computing devices such as a PC, a tablet PC, a netbook, and the like, and electronic devices such as a TV, a smart TV, a security device for gate control, and the like.

The network interface 1200 may be implemented so as to communicate with an external network using any of various wired/wireless methods.

The memory 1300 may store computer-readable instructions. The processor 1100 may perform the above-described operations by executing the instructions stored in the memory 1300. The memory 1300 may be volatile or nonvolatile memory. The memory 1300 may include a storage device in order to store user data. The storage device may be an embedded multimedia card (eMMC), a solid-state drive (SSD), universal flash storage (UFS), or the like. The storage device may include at least one nonvolatile memory device. The nonvolatile memory device may be any one of NAND flash memory, Vertical NAND (VNAND), NOR flash memory, Resistive Random-Access Memory (RRAM), Phase-Change Random-Access Memory (PRAM), Magnetoresistive Random-Access Memory (MRAM), Ferroelectric Random-Access Memory (FRAM), Spin-Transfer-Torque Random-Access Memory (STT-RAM), and the like.

The embodiments described above may be implemented through hardware components, software components, and/or a combination thereof. For example, the apparatus, method and components described in the embodiments may be implemented using one or more general-purpose computers or special-purpose computers, for example, a processor, a controller, an arithmetic logic unit (ALU), a digital signal processor, a microcomputer, a field-programmable gate array (FPGA), a programmable logic unit (PLU), a microprocessor, or any other device capable of executing instructions and responding thereto. The processing device may run an operating system (OS) and one or more software applications executed on the OS.

Also, the processing device may access, store, manipulate, process and create data in response to execution of the software. For the convenience of description, the processing device is described as a single device, but those having ordinary skill in the art will understand that the processing device may include multiple processing elements and/or multiple forms of processing elements. For example, the processing device may include multiple processors or a single processor and a single controller. Also, other processing configurations such as parallel processors may be available.

The software may include a computer program, code, instructions, or a combination thereof, and may configure a processing device to be operated as desired, or may independently or collectively instruct the processing device to be operated. The software and/or data may be permanently or temporarily embodied in a specific form of machines, components, physical equipment, virtual equipment, computer storage media or devices, or transmitted signal waves in order to be interpreted by a processing device or to provide instructions or data to the processing device. The software may be distributed across computer systems connected with each other via a network, and may be stored or run in a distributed manner. The software and data may be stored in one or more computer-readable storage media.

The method according to the embodiments may be implemented as program instructions executable by various computer devices, and may be recorded in computer-readable storage media. The computer-readable storage media may individually or collectively include program instructions, data files, data structures, and the like. The program instructions recorded in the media may be specially designed and configured for the embodiment, or may be readily available and well known to computer software experts. Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, and the like, that is, a hardware device specially configured for storing and executing program instructions. Examples of the program instructions include not only machine code made by a compiler but also high-level language code executable by a computer using an interpreter or the like. The above-mentioned hardware device may be configured so as to operate as one or more software modules in order to perform the operations of the embodiment, and vice-versa.

The system for providing a cell broadcast service according to an embodiment of the present invention may convert a cell broadcast service signal into a signal based on the public warning broadcast standard of terrestrial UHDTV and transmit the converted signal when a backbone network is damaged.

The system for providing a cell broadcast service according to an embodiment of the present invention uses a base station or mobile switching center capable of receiving a public warning broadcast signal based on the terrestrial UHDTV standard. Accordingly, the base station or the mobile switching center may receive a public warning broadcast signal based on the terrestrial UHDTV standard, convert the same to a cell broadcast message, and transmit the cell broadcast message to user terminals.

The method and apparatus for a cell broadcast service according to an embodiment of the present invention may more reliably provide a cell broadcast service for transmitting an emergency alert, which is currently provided over a broadband network using a CBS function.

The method and apparatus for a cell broadcast service for transmitting an emergency alert according to an embodiment of the present invention provide the function of additionally transmitting a cell broadcast message over a broadcast network in preparation for failure of a broadband network, thereby improving a service related to public safety.

Meanwhile, the above description is merely specific embodiments for practicing the present invention. The present invention encompasses not only concrete and available means but also the technical spirit corresponding to abstract and conceptual ideas that may be used as future technology.

What is claimed is:

1. An operating method of an apparatus for providing a cell broadcast service, comprising:
    receiving, by a reception device of a base station, a public warning broadcast signal from a broadcaster;
    extracting, by the reception device, an emergency alert from the public warning broadcast signal;
    downloading, by the reception device, rich media when the public warning broadcast signal includes rich-media information;
    generating, by the reception device, Uniform Resource Locator (URL) information for accessing the downloaded rich media; and
    generating, by the reception device, a cell broadcast message that includes the extracted emergency alert and the generated URL information;
    wherein when the public warning broadcast signal includes a cell broadcast service Non-Real-Time (NRT) file, the NRT file shall include a flag for stipulating that the NRT file be processed only by the base station but be ignored by a TV.

2. The operating method of claim 1, further comprising: after receiving the public warning broadcast signal, checking, by the reception device, whether an Advanced Emergency Alert (AEA) message for Cell Broadcast Service (CBS) is present.

3. The operating method of claim 2, wherein extracting the emergency alert comprises: extracting the emergency alert from an AEAText field when the AEA message for CBS is present.

4. The operating method of claim 3, wherein extracting the emergency alert further comprises: checking whether an Advanced Emergency Alert (AEA) message corresponding to the identical disaster information as the disaster information included in the public warning broadcast signal is present using a 'relatedAEAId' element.

5. The operating method of claim 4, wherein downloading the rich media comprises: downloading the rich media included in a LiveMedia field or a Media field when the AEA message is present.

6. The operating method of claim 1, further comprising: after receiving the public warning broadcast signal, checking, by the reception device, whether the NRT file for Cell Broadcast Service (CBS) is present.

7. The operating method of claim 6, wherein extracting the emergency alert comprises: extracting the emergency alert from the NRT file for CBS when the NRT file for CBS is present.

8. The operating method of claim 6, further comprising: checking whether an Advanced Emergency Alert (AEA) message corresponding to the identical disaster information as the disaster information included in the public warning broadcast signal is present using an 'ExistCbsNrt' element, wherein the rich media is downloaded when the AEA message is present.

9. An apparatus for providing a cell broadcast service, comprising:

a receiver for receiving a public warning broadcast signal;

an Advanced Emergency Alert Table (AEAT) parser for extracting an emergency alert and rich-media information from the public warning broadcast signal; and a cell broadcast message conversion device for generating Uniform Resource Locator (URL) information corresponding to the rich-media information and generating a cell broadcast message including the extracted emergency alert and the generated URL information, wherein when the public warning broadcast signal includes a cell broadcast service Non-Real-Time (NRT) file, the NRT file shall include a flag for stipulating that the NRT file be processed only by a base station but be ignored by a TV.

* * * * *